US010937425B2

(12) United States Patent
Summa et al.

(10) Patent No.: US 10,937,425 B2
(45) Date of Patent: Mar. 2, 2021

(54) SYSTEMS AND METHODS FOR SELECTIVELY ACTIVATING AND INTERACTING WITH A SPEECH RECOGNITION SERVICE DURING APPLICATION RUNTIME WITHOUT INTERRUPTING EXECUTION OF THE APPLICATION (71) Applicant: DELL PRODUCTS L.P., Round Rock, TX (US)

(72) Inventors: Erik P. Summa, Austin, TX (US); John S. Pruitt, Cedar Park, TX (US); Gregory J. Baluch, Austin, TX (US); Simon W. Jackson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 82 days.

(21) Appl. No.: 16/244,818

(22) Filed: Jan. 10, 2019

(65) Prior Publication Data
US 2020/0227034 A1    Jul. 16, 2020

(51) Int. Cl.
*G10L 15/22* (2006.01)
*G10L 15/08* (2006.01)
(Continued)

(52) U.S. Cl.
CPC .............. *G10L 15/22* (2013.01); *G06F 3/013* (2013.01); *G06F 3/167* (2013.01); *G10L 15/08* (2013.01);
(Continued)

(58) Field of Classification Search
CPC ... G10L 15/00; G10L 2015/088; G10L 25/78; G10L 15/30; H04L 51/046;
(Continued)

(56) References Cited
U.S. PATENT DOCUMENTS 8,674,941 B2   3/2014  Casparian et al.
8,700,829 B2   4/2014  Casparian et al.
(Continued)

OTHER PUBLICATIONS

Hunter, "12 Video Game Companion Apps You Should Have on Your Mobile Phone", Complex, Apr. 2013, 10 pgs.
(Continued)

*Primary Examiner* — Yogeshkumar Patel
(74) *Attorney, Agent, or Firm* — Egan, Enders & Huston, LLP.

(57) ABSTRACT

Systems and methods are provided that may be implemented to allow an information handling system user to selectively activate and interact with a speech recognition service for system control during application runtime on the same system, and without interrupting the separate application on the same information handling system. The activated speech recognition service may respond to verbal commands to control one or more operating characteristics of the information handling system while the separate application (e.g., such as a computer game) is simultaneously executing without interruption on the same system. A user may be allowed to activate the speech recognition service using one or more different activation modes, e.g., using eye tracking, call word recognition, and/or hardware input/output actuation.

24 Claims, 6 Drawing Sheets (51) Int. Cl.
*G06F 3/16* (2006.01)
*H04L 12/58* (2006.01)
*G06F 3/01* (2006.01)

(52) U.S. Cl.
CPC ...... *H04L 51/046* (2013.01); *G10L 2015/088* (2013.01); *G10L 2015/223* (2013.01); *G10L 2015/228* (2013.01)

(58) Field of Classification Search
CPC ..... H04L 12/1827; H04L 51/32; H04L 51/10; H04L 65/403; H04L 67/22; G06F 3/017; G06F 3/167; G06F 3/165; G06F 3/013; H04R 3/00; A63F 13/87; A63F 13/35; A63F 13/12; H04N 7/15
See application file for complete search history.

(56) References Cited

U.S. PATENT DOCUMENTS

| | | |
|---|---|---|
| 9,342,149 B2 | 5/2016 | Casparian et al. |
| 9,468,853 B2 | 10/2016 | Liendo et al. |
| 9,696,793 B2 | 7/2017 | Ross et al. |
| 9,763,021 B1 | 9/2017 | Peeler et al. |
| 9,959,996 B2 | 5/2018 | Casparian et al. |
| 2012/0206554 A1* | 8/2012 | Garcia ............ H04N 7/15 348/14.01 |
| 2017/0093944 A1* | 3/2017 | Hockett ............ H04L 12/1818 |
| 2017/0266569 A1* | 9/2017 | Sullivan ............ A63F 13/352 |
| 2019/0235255 A1 | 8/2019 | Seibert et al. |

OTHER PUBLICATIONS

Wikipedia, "Speech Recognition", Dec. 2018, 8 pgs.
VoiceBot by Binary Fortress Software, VoiceBot Screenshots, printed from Internet Oct. 30, 2018, 6 pgs.
Turner, "Companion Apps Might Change the Way We Play Video Games", Study Breaks, printed from Internet Oct. 30, 2018, 5 pgs.
VoiceBot by Binary Fortress Software, Voice Powered Game Control, printed from Internet Oct. 30, 2018, 3 pgs.
Human Performance Center, Voice/Speech Recognition/Synthesis, Voice-Commands.com, 2003, 2 pgs.
Tobii Unity SDK, "Tobii Eye Tracking Features" printed from Internet Jan. 6, 2019, 8 pages.

* cited by examiner

SYSTEMS AND METHODS FOR SELECTIVELY ACTIVATING AND INTERACTING WITH A SPEECH RECOGNITION SERVICE DURING APPLICATION RUNTIME WITHOUT INTERRUPTING EXECUTION OF THE APPLICATION

FIELD

This invention relates generally to information handling systems and, more particularly, to activating and/or interacting with a speech recognition service during application runtime.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Eye tracking systems have been used in the past to track the position of a computer user's eye position for a variety of purposes. Example eye tracking implementations include tracking a user's eye position on a virtual reality scene while wearing a virtual reality headset, using a tracked user's eye position to move a camera scene around a video scene displayed on a computer video monitor, tracking the eye position of different online game players to display to a given game player what part of a common gaming scene that each of the other players are looking at, and to display a "hotspot" at the position on a current video scene where a user is currently looking.

Existing game applications have used both hotkey-activated and mouse pointer-activated overlays during a game session. These existing overlays are implemented as menus or toolbars that take the user away from the current game by occupying the user's hands and attention while interacting with the overlay.

SUMMARY

Disclosed herein are systems and methods that may be implemented to allow an information handling system user to selectively activate and interact with a speech recognition service for system control during runtime of a separate application executing on the same system, and without interrupting the operation of the separate application executing on the same information handling system. In one embodiment, the disclosed systems and methods may be so implemented to activate the speech recognition service so that it will respond to verbal commands to control one or more operating characteristics of the information handling system while a separate application (e.g., such as a computer game) is simultaneously executing without interruption on the same information handling system. In different embodiments, an information handling system user may be allowed to activate the voice recognition service using one or more different activation modes, e.g., using eye tracking, call word recognition, and/or hardware input/output actuation.

In one embodiment, the speech recognition service may be implemented an as in-game voice assistant companion application (or "app"), such as during a gaming session in which an online computer game is simultaneously executing on the same information handling system. In such an embodiment, the disclosed systems and methods may be further implemented to automatically mute any outgoing voice chat audio to other online game players during all times the service is activated to receive user-spoken voice commands to dynamically switch game settings in-game (e.g., to change hardware lighting or haptics settings, record a video, assign game macros, etc.) without requiring the user to divide their attention between making the desired game setting change/s and playing their game. Such an embodiment may be so implemented to give a user who is a gamer a competitive advantage while playing video games, especially against other online players.

In the practice of the disclosed systems and methods, a human user may be enabled to invoke a service executing as an in-game voice assistant companion to listen for verbal user commands in a variety of ways. Thus, in various embodiments, an in-game voice assistant companion may be invoked on an information handling system by a user using different activation modes, e.g., as suited to the style, context and preference of the particular user. Example activation mode embodiments include, but are not limited to, eye/mouse "hotspot" zone activation in which a user may invoke an in-game voice assistant companion by pointing to a particular designated hotspot section of a system display screen with the user's eyes (using eye gaze via eye tracker) or with an input/output (I/O) pointing device such as a mouse pointer. In a voice activation mode embodiment, a user may invoke an in-game voice assistant companion by speaking a designated custom "call word" that is recognized by logic (e.g., software, firmware or other code or list of instructions) executing on the information handling system. In a manual I/O hardware activation mode embodiment, a user may invoke an in-game voice assistant companion by manipulating or otherwise actuating a dedicated hardware device, such as button, toggle switch, or assigned keyboard hotkey.

In a further embodiment, any currently-executing in-game voice chat program may be automatically and dynamically muted on the user's information handling system during an online gaming session once an in-game voice assistant companion is invoked in-game by the user (e.g., to reduce online team-mate confusion and/or to hide the user's verbal commands from other online enemy game players so that they do not hear these verbal commands). The in-game voice chat program may only be temporarily disabled (e.g., briefly disabled or muted) while the user is speaking commands, after which the in-game chat program may then be automatically re-enabled once the user is finished interacting (e.g., giving verbal commands to) with the in-game voice assistant companion.

In one embodiment, an in-game voice assistant companion may be invoked by a human user in an eye gaze mode by leveraging existing and/or built-in eye tracking hardware that is already provided on a component of an information handling system, e.g., such as integrated within a notebook computer display (lid) or within a separate video display component. In such an embodiment, the eye gaze mode may execute on a processing device of the information handling system to determine to activate a voice assistant companion when a user's gaze is directed at the position of a "hotspot" zone on a video display, and may utilize a user's voice as a natural multi-tasking input medium during the time the voice assistant companion is so activated. In such an embodiment, the voice assistant companion may be invoked to listen to a user's voice commands by a user's eye gaze at a particular designated section of the display screen or using other activation mode (e.g., alternatively by a call word, hardware I/O activation), and then to take corresponding actions in response to the voice commands, e.g., in a manner that allows for the user to initiate a parallel task hands-free.

In one respect, disclosed herein is a method, including: executing an application on a first information handling system to display a graphics scene to a human user on a video display device; receiving analog audio sounds from the human user that is viewing the displayed graphics scene, and transferring the received audio sounds from the first information handling system as outgoing voice chat to one or more other information handling systems communicatively coupled by a network to the first information handling system; detecting an activation action from the human user while the graphics scene is displayed on the video display device; and responding to the detected activation action by: temporarily muting the outgoing voice chat and using voice recognition while the outgoing voice chat is muted to analyze any received analog audio signals to recognize a predefined voice command spoken by the human user, then executing a command corresponding to the predefined voice command to modify one or more operating characteristics of the executing application and/or other components of the information handling system, and then unmuting the outgoing voice chat.

In another respect, disclosed herein is a method, including: executing an application on a first information handling system to display a graphics scene to a human user on a video display device; tracking a gaze of a human user that is viewing the displayed graphics scene; detecting a location of a tracked gaze of the human user relative to a location of a predetermined activation area while the graphics scene is displayed on the video display device; receiving analog audio sounds from the human user that is viewing the displayed graphics scene, and transferring the received audio sounds from the first information handling system as outgoing voice chat to one or more other information handling systems communicatively coupled by a network to the first information handling system as long as the detected location of the tracked gaze of the human user does not coincide with the location of the predetermined activation area; and then responding to detecting that the location of the tracked gaze of the human user coincides with at least a portion of the location of the predetermined activation area by: temporarily muting the outgoing voice chat and using voice recognition while the outgoing voice chat is muted to analyze any received analog audio signals to recognize a predefined voice command spoken by the human user, then executing a command corresponding to the predefined voice command to modify one or more operating characteristics of the executing application and/or other components of the information handling system, and then unmuting the outgoing voice chat.

In one respect, disclosed herein is a system, including a first information handling system including at least one programmable integrated circuit executing an application to display a graphics scene to a human user on a video display device that is coupled to the programmable integrated circuit, the at least one programmable integrated circuit further executing to: receive analog audio sounds from the human user that is viewing the displayed graphics scene, and transfer the received audio sounds from the first information handling system as outgoing voice chat to one or more other information handling systems communicatively coupled by a network to the first information handling system; detect an activation action from the human user while the graphics scene is displayed on the video display device; and respond to the detected activation action by: temporarily muting the outgoing voice chat and using voice recognition while the outgoing voice chat is muted to analyze any received analog audio signals to recognize a predefined voice command spoken by the human user, then executing a command corresponding to the predefined voice command to modify one or more operating characteristics of the executing application and/or other components of the information handling system, and then unmuting the outgoing voice chat.

DESCRIPTION OF ILLUSTRATIVE EMBODIMENTS

Figure 1:
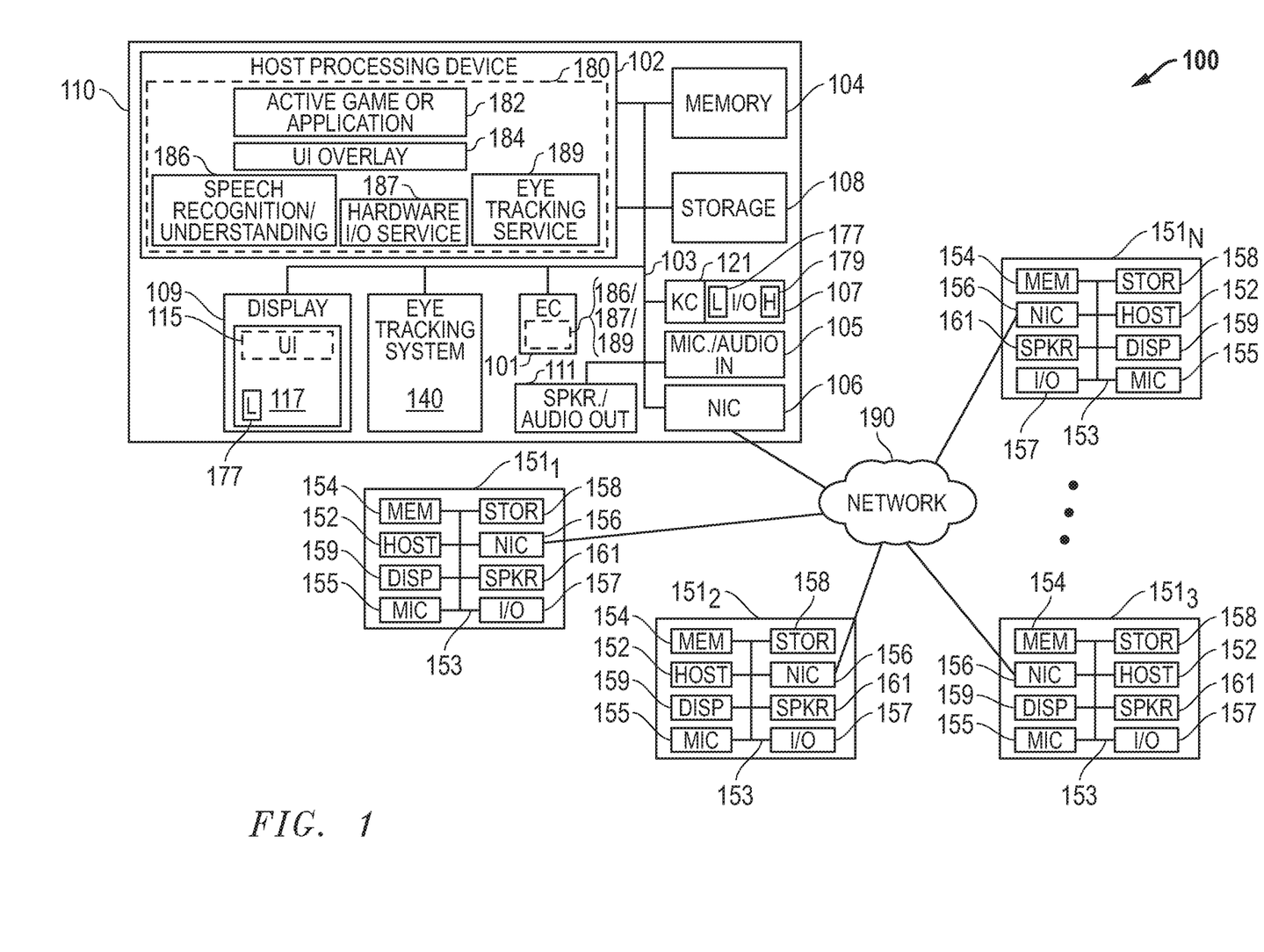
FIG. 1 illustrates a network architecture according to one exemplary embodiment of the disclosed systems and methods.

FIG. 1 illustrates one exemplary embodiment of a network architecture 100 that includes multiple information handling systems 110, and $151_1$-$151_N$ that are in communication (e.g., via TCP/IP or Internet protocol) with each other across a network 190, such as the Internet or corporate intranet. In this embodiment, system 110 is being operated by a human user to execute an active application 182 (e.g., such as multi-player online computer game or other software application) that interacts with the other information handling systems $151_1$-$151_N$ which may also be operated by human users to execute corresponding versions of the same application 182 (e.g., online computer game). Each of information handling systems $151_1$-$151_N$ may be, for example, a non-mobile desktop or tower computer, or may be a mobile system such as notebook or laptop computer, tablet computer, smart phone, etc. In one embodiment, information handling systems $151_1$-$151_N$ may communicate across network 190 in a peer-to-peer relationship. However, in other embodiments, at least one of information handling systems $151_1$-$151_N$ may be a web server that executes functions for, and/or coordinates interaction between, multiple versions of application 182 executing as clients on two or more other information handling systems $151_1$-$151_N$. Moreover, in other network architectures, any other greater or lesser number of multiple information handling systems $151_1$-$151_N$ may be similarly coupled together in peer-to-peer or client-server relationship across a network 190.

In FIG. 1, system 110 includes at least one host processing device 102 (e.g., AMD or Intel-based CPU such as Itanium or any other type of suitable host processing device), one or more buses or communication media 103 (e.g., PCIe bus, USB, SMBus, SATA, other appropriate data buses such as memory bus, etc.), non-volatile storage 108 (e.g., hard drive/s, solid state drive/s "SSDs" and or other non-volatile memory), and system volatile memory (e.g., DRAM) 104. The host processing device/s 102 of system 110 executes a version of the active application 182 on a host operating system (OS) 180 (e.g., Microsoft Windows-based OS, Linux-based OS, Android OS, iOS, etc.). Bus/es 103 provides a mechanism for the various components of system 110 to communicate and couple with one another. As shown, system 110 may be provided as shown with a network interface card (NIC) 106 that is communicatively coupled to network 190 to allow various components of system 110 to communicate through NIC 106 with components of other information handling systems $151_1$-$151_N$ across network 190.

As further shown in FIG. 1, system 110 includes video display device (e.g., LCD display, LED display, etc.) and user interface (UI) component/s 109 that may be optionally integrated into one component (e.g., LCD or LED display touchscreen device) for displaying visual information (including a graphics scene 117 generated by active application 182) to a human user and optionally for receiving user input from a human user, and/or may include separate input/output (I/O) component/s 107 (e.g., mouse, keyboard, etc.) as shown for performing this function. Display/UI component/s 109 may be coupled to bus 103 as shown and/or may be optionally coupled directly to host processing device 102 depending on the particular configuration of the given system (e.g., coupled directly to integrated graphics of a host processing device 102 and/or separately coupled via bus 103 to receive video information from an optional graphics processor unit "GPU" not shown). System hardware such as display device 109 and/or I/O components 107 may optionally include lighting 177 (e.g., multi-colored key and/or keyboard lighting, etc.) and/or haptics 179 (e.g., key and or keyboard vibration, etc.). Further information on examples of suitable lighting and haptics that may be employed may be found, for example in U.S. Pat. Nos. 8,674,941, 9,959,996, 9,763,021, and 9,342,149, each of which is incorporated herein by reference in its entirety for all purposes.

Other components of system 110 that may be coupled to host processing device 102 via bus/es 103 include, but are not limited to, microphone and audio-in circuitry 105 (e.g., analog to digital conversion, audio encoding, etc.) that receives analog sounds such as human user voice commands and in-game chat, and speaker and audio-out circuitry 111 (e.g., audio decoding and digital to analog conversion, amplifier, etc.) that outputs sounds (e.g., application-generated sounds, in-game chat from other online gaming players, etc.) to a human user.

Also coupled to host processing device 102 is eye tracking system hardware system components 140 which may include eye tracking and/or other gaze detection hardware that is configured to detect the position and/or gaze direction of the user's eyes, e.g., while the user is viewing a graphics scene 117 displayed on display device 109 within the display area of display device 109 by application 182 executing on host processing device 102. For example, in one embodiment, eye tracking hardware 140 may include one or more light sources positioned for illuminating the user's eyes, and one or more photosensors (or cameras) positioned for detecting light reflected off the user's eyes. In another embodiment, eye tracking hardware 140 may additionally or alternatively include a "world facing camera," or a camera positioned for capturing images of the user's physical environment in the user's front field of view.

In some embodiments, an eye tracking system 140 may be configured to generate eye tracking data based on the light reflected off the user's eyes and detected by photosensors of the eye tracking system 140. Eye tracking data may include, but is not limited to, a gaze point location, a gaze direction, one or more gaze vectors, and an inter-pupillary distance (IPD) measurement, etc. The gaze point location (GP) is the location of the user's gaze (i.e., the point at which the user is looking). Gaze vectors ($G_1$ and/or $G_2$) include the gaze direction (θ) (i.e., the direction of the user's gaze) and the distance (magnitude of the gaze vector) between the gaze point and the user's eyes. The inter-pupillary distance (IPD) is the distance between the user's pupils. In some embodiments, an eye tracking system 140 may be configured to provide all of the eye tracking data mentioned above. In other embodiments, an eye tracking system 140 may only be configured to provide a subset of this data, such as gaze direction and IPD, or to only provide one eye tracking datum, such as gaze direction. Further information on hardware and logic that may be implemented for eye tracking system 140 may be found in U.S. patent application Ser. No. 15/886,549 by Seibert et al, filed Feb. 1, 2018, which is incorporated herein by reference in its entirety for all purposes.

Still referring to FIG. 1, each of other systems $151_1$-$151_N$ may include various components that are configured to operate and function similar to corresponding components of system 110. Such components may include at least one host processing device 152 (e.g., AMD or Intel-based CPU such as Itanium or any other type of suitable host processing device), one or more buses or communication media 153 (e.g., PCIe bus, USB, SMBus, SATA, other appropriate data buses such as memory bus, etc.), non-volatile storage 158 (e.g., hard drive/s, solid state drive/s "SSDs" and or other non-volatile memory), and system volatile memory 154 (e.g., DRAM). Each of systems $151_1$-$151_N$ may also include a video display device (e.g., LCD display, LED display, etc.) and user interface (UI) component/s 159 that may be optionally integrated into one component (e.g., LCD or LED display touchscreen device) for displaying information to a human user and optionally for receiving user input from a human user, and/or may include separate input/output (I/O) component/s 157 (e.g., mouse, keyboard, etc.) as shown for performing this function. Display 157 and/or UI components 159 may be coupled to the other components of each system $151_1$-$151_N$, depending on the particular configuration of the given system (e.g., coupled directly to integrated graphics of a host processing device 152 and/or separately coupled via bus 153 to provide user input signals to host processing device 152 through other components and/or to receive video information from an optional GPU not shown).

Each of systems $151_1$-$151_N$ may also be provided with speaker/audio out circuitry 161 and microphone/audio in circuitry 155. The host processing device/s 152 of each of systems $151_1$-$151_N$ may execute a host OS (e.g., Microsoft Windows-based OS, Linux-based OS, Android OS, iOS, etc.), and bus/es 153 of each system $151_1$-$151_N$ may provide a mechanism for the various components of each system 151 to communicate and couple with one another. Each of systems $151_1$-$151_N$ may be provided as shown with a network interface card (NIC) 156 that is communicatively coupled to network 190 to allow various components of each system $151_1$-$151_N$ to communicate through its NIC 106 with components of other information handling systems 100 and 151 across network 190. As previously stated, the above-described components of each of systems $151_1$-$151_N$ may operate and function in similar manner described for the corresponding components of system 110. Although not shown, one or more of systems $151_1$-$151_N$ may also be optionally provided with an eye tracking system coupled by a respective bus 153 to other components of the system 151 and configured to operate and function with software or other logic executing on its host processing device 152 in a similar manner as described herein for system 110.

In FIG. 1, host processing device 110 is shown executing one instance of an active game or other application 182 on OS 180, together with other logic or software components that include UI overlay service logic 184, speech recognition/understanding logic 186 (which may operate as a keyword spotter), hardware I/O service logic 187 and eye tracking service logic 189, each of which may be executed by host processing system 102 and/or other processing devices of information handling system 110 as software, firmware or other code or list of instructions as described further herein. In this regard, although speech recognition/understanding logic 186, hardware I/O service logic 187 and eye tracking service logic 189 are each shown in FIG. 1 executing on host processing device 102, it is alternatively possible that any one or more of speech recognition/understanding logic 186, hardware I/O service logic 187 and eye tracking service logic 189 may execute on another separate processing device of system 110, e.g., such as on embedded controller 101 as shown in dashed outline or on other separate chipset. If one or more of speech recognition/understanding logic 186, hardware I/O service logic 187 and eye tracking service logic 189 are so executed on a separate processing device from host 102, then these service/s do not take up processor (CPU) cycles of host 102 to listen for voice commands or sense other user activation actions, and instead "hand off" to the host processing device 102 as needed to activate the UI overlay 184 in response to a given user activation action. In one embodiment, an application programming interface (API) may be present to allow application (e.g., game) 182 to interface with UI overlay service logic 184 (which executes externally and separately from application 182).

In one embodiment, application 182 may be one instance of a multi-player online game in which a human user of system 110 is one player. In FIG. 1, host processing devices 182 of each of systems $151_1$-$151_N$ may each execute another respective instance of the same application 182, and respective human users of systems $151_1$-$151_N$ are other players that simultaneously interact with each other and with user of system 110 across network 190 in the shared context of the corresponding multiple instances of application 182 during a common online gaming session. During such a gaming session, active application 182 may be executed to display a graphics scene (in this case a gaming scene) 117 within the display area of display device 109. In one embodiment, UI overlay service 184 may execute to alternately hide and then selectively temporarily project a user interface (UI) 115 in a predetermined position as shown over the gaming scene 117 when activated by the user of system 110. As described further herein, a user may activate projection of the UI 115 by detection of the direction or location of the user's gaze upon a predetermined position or location of an activation area or region of display 117 that may in one embodiment coincide with the position of UI 115, and/or by other activation technique (e.g., such as in response to the speaking of an activation phrase by the user, or in response to user manipulation of a dedicated hardware device, such as button, switch, or assigned keyboard hotkey.

Figure 2:
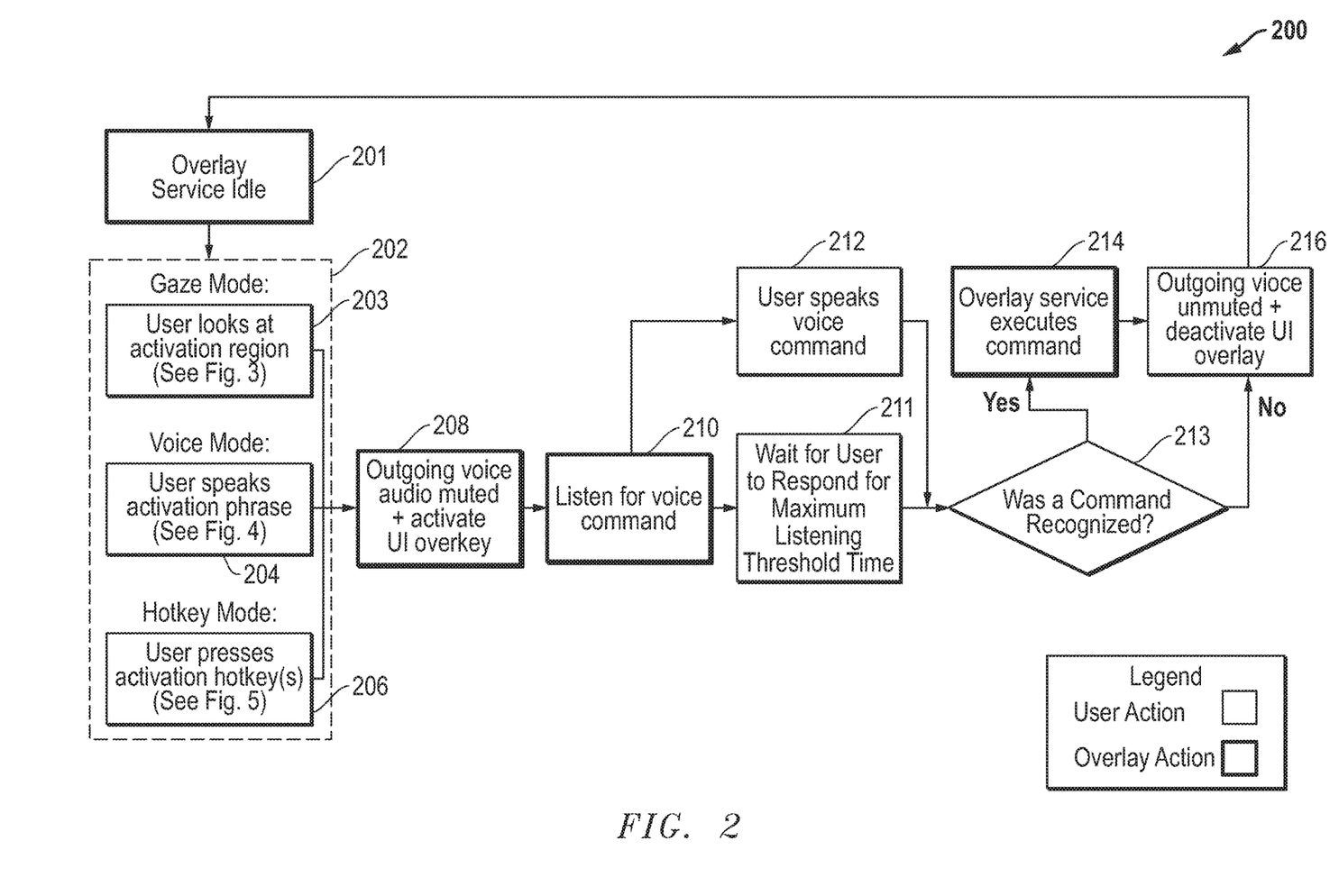
FIG. 2 illustrates methodology according to one exemplary embodiment of the disclosed systems and methods.

FIG. 2 illustrates one exemplary embodiment of a methodology 200 that may be executed by host processing device 102 of system 110 during an online gaming session with other systems $151_1$-$151_N$. In such an embodiment, each of system 110 and other systems $151_1$-$151_N$ may be executing a separate respective instance of the same online game 182, and may verbally communicate during game play with each other across network 109 via online game chat software that uses microphones and circuitry 105/155 to audibly receive each user's spoken words at one of the systems, and speakers and circuitry 111/161 to receive and audibly reproduce the user's spoken words at the other systems. During normal game play in step 201, UI overlay service 184 is idle and other online game players (who are users of other systems $151_1$-$151_N$ that are executing other instances of the same online game 182) are able to hear in real time words spoken by user 250 into microphone/circuitry 105 of system 110, and vice-versa. This remains the case until a user activation action 203, 204 or 206 occurs in user activation step 202 of FIG. 2.

As shown in FIG. 2, a user activation step 202 may occur at any time desired by the user 250 of system 110 during normal operation of step 201 of an online gaming session with UI overlay service 184 idle. During normal game play corresponding to step 201 of FIG. 2 with UI overlay service 184 idle, game scene 117 is displayed on display 109 with user interface 115 hidden and not projected onto game scene 177 as shown in the normal game play windows 302, 402 and 502 of respective FIGS. 3, 4 and 5.

Figure 3:
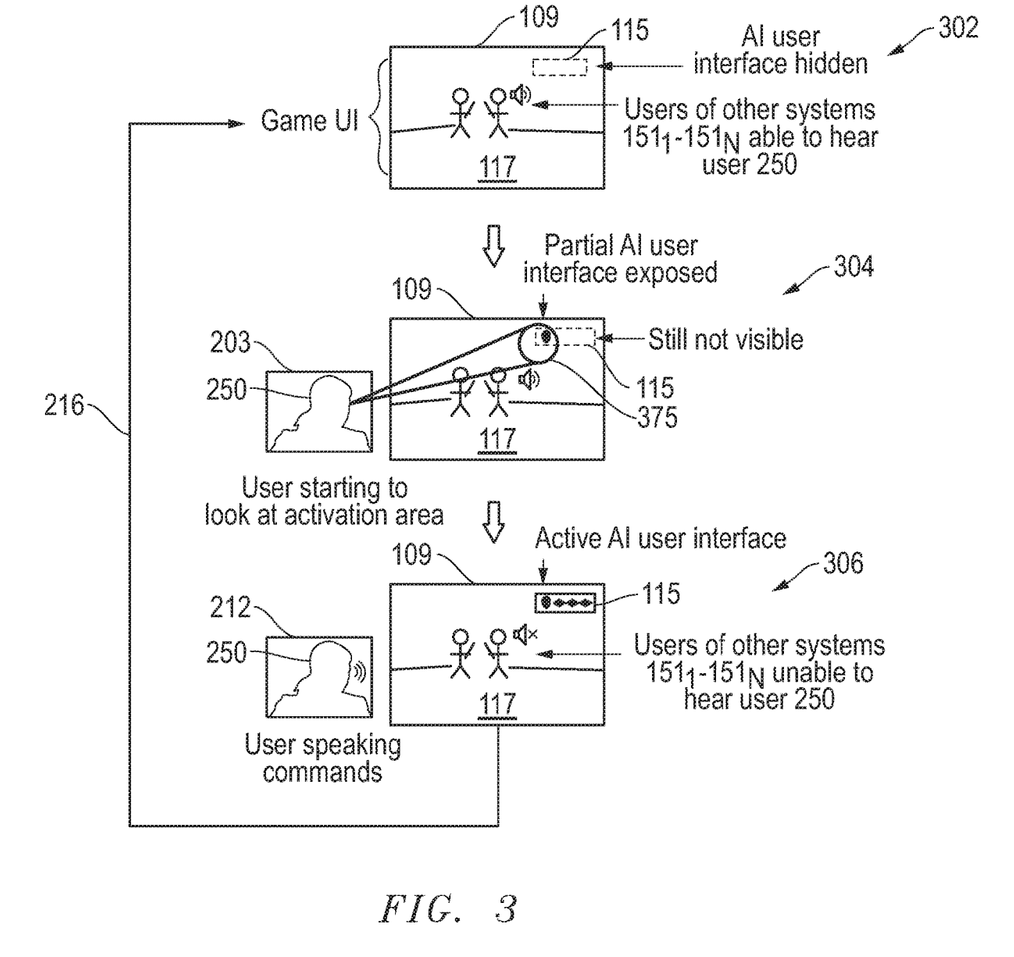
FIG. 3 illustrates methodology according to one exemplary embodiment of the disclosed systems and methods.

For example, referring to the eye gaze mode activation embodiment 203 of FIG. 3, the current and real time direction of the eye gaze 375 of a user 250 relative to the predetermined fixed "landmark" position of UI 115 may be continuously determined by eye tracking service logic 189 based on input data received from eye tracking system 140 throughout all steps of FIG. 2. In this embodiment, normal game play condition 302 of FIG. 3 (corresponding to step 201 of FIG. 2 with UI overlay service 184 idle) continues as long as user 250 directs their gaze 375 at any position within gaming scene 117 except the predetermined position of user interface 115, which is illustrated as being the upper right corner of scene 117. It will be understood, however, that the position of an UI 115 may be located anywhere else within a displayed scene 117 to fit the needs or desires for a given embodiment. Moreover, in another embodiment, position of a similar "spotlight" area may alternatively be controlled by the position of a mouse pointer that is controlled by the user 250.

In the embodiment of FIG. 3, a user activation step 202 may be implemented by eye tracking service logic 189 when it detects from data of eye tracking system 140 that the current real time direction of the gaze 375 of user 250 is directed upon the designated predetermined position of an activation area of gaming scene 117 as illustrated and described in relation to windows 304 and 306 of FIG. 3. The position or location of such a predetermined activation area or region may, for example, be previously stored on non-volatile storage 108 of information handling system 110, on other non-volatile storage of information handling system 110 (e.g., such as Flash memory), previously stored in cloud storage accessible by information handling system 110 across network 190, etc. Specifically, referring now to window 304 of FIG. 3, user 250 begins to direct their gaze 375 (which may be projected as a spotlight of predetermined size and shape onto display area 117) onto the designated activation area which in this embodiment coincides with the position of the user interface (UI) 115 as shown in window 304 of FIG. 3. Examples of predetermined shape and size of gaze spotlight 375 as it may be displayed (e.g., on a monitor of 13 inch to 15 inches in size) include a circular shape having a radius of 0.375 inch, or a square shape of 0.75 inch by 0.75 inch, although any other shape and/or greater or lesser size of gaze spotlight 375 may be displayed on monitors of the same or greater or lesser size, e.g., to fit the characteristics of a given application.

When user 250 begins to direct their gaze 375 onto the designated predetermined activation area of UI 115, eye tracking service logic 189 (which may always be active and monitoring the gaze of the user) receives data from eye tracking system 140 that indicates that the user's gaze 375 is at least partially directed on the hidden position of UI 115. This data may be in form of gaze points provided by the eye tracking system 140 and/or may be computed by the eye tracking service logic 189 based on raw eye position data provided by eye tracking system 140. For example, eye tracking system 140 may in one embodiment pinpoint gaze and focal point locations of user 250 in three dimensions within a volume of space localized around the sensors of the system, and data map a projection for the gaze on to the plane of the display 109. As shown in window 304, only the portion of UI 115 within the current gaze 375 of user 250 is now displayed and made more opaque, while the remainder of the UI 115 remains hidden or invisible. At this time, the UI overlay service 184 may not be active and UI 115 may be only partially displayed so that user 250 has a frame of reference or "landmark" to know how much further their gaze needs to be moved to be centered onto the UI 115 in order to activate the UI overlay service 184 and UI 115 at the exact moment desired (if user 250 looks away, the UI 115 will disappear from gaming scene 117). Until UI overlay service 184 is activated, voice chat operation on system 110 remains active and unmuted, so that users of other systems $151_1$-$151_N$ continue to hear words spoken by user 250 into microphone and audio-in circuitry 105. However in other embodiments, UI overlay service 184 may be activated and/or all of UI 115 may be displayed as soon as the direction or location of the current gaze of user 250 is detected to coincide or overlap with at least a portion of UI 115 or other predetermined designated activation area.

Figure 6:
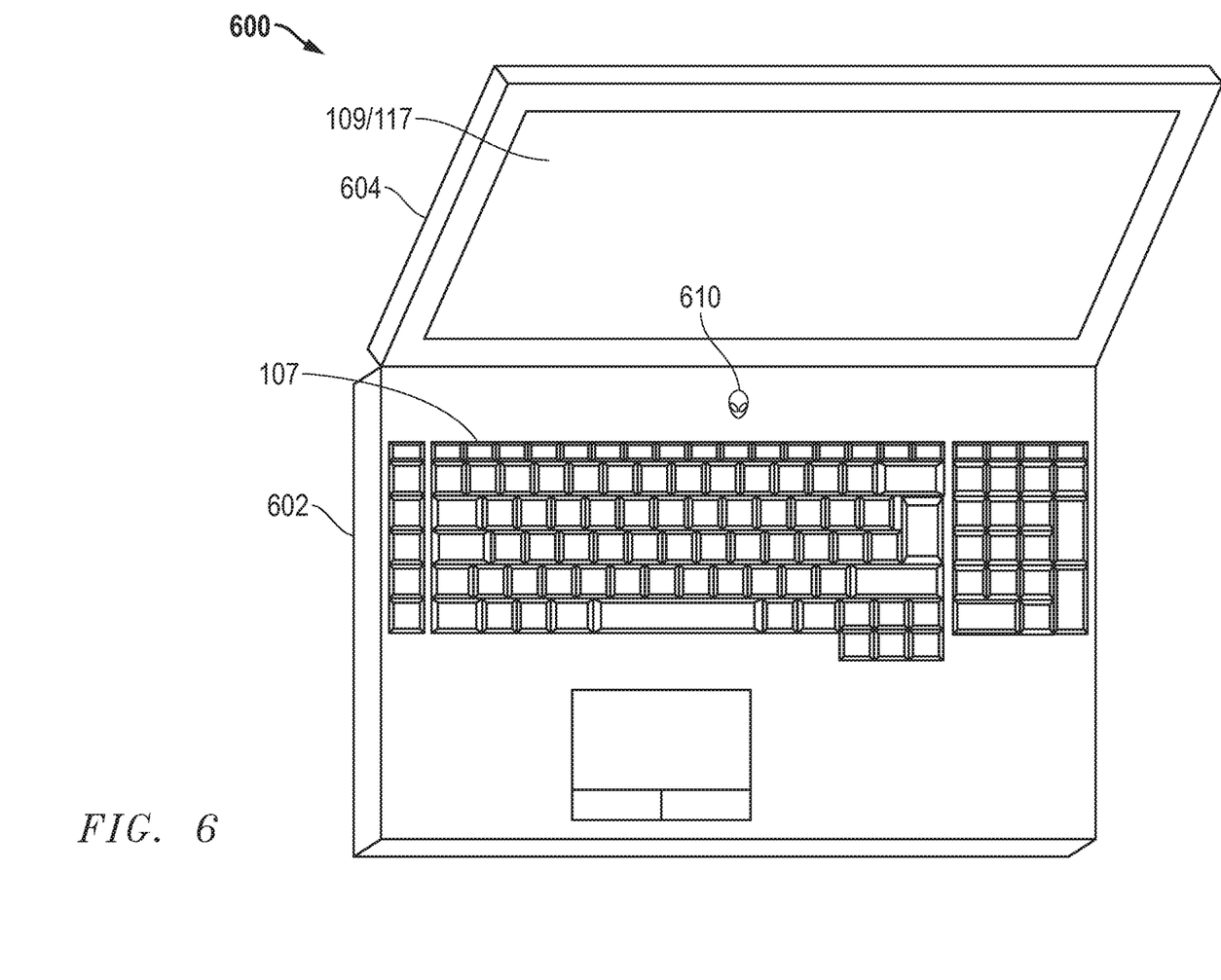
FIG. 6 illustrates a notebook computer system according to one exemplary embodiment of the disclosed systems and methods.

In an alternate embodiment, eye tracking system 140 may pinpoint gaze and focal point locations of user 250 in three dimensions within a volume of space localized around the sensors of the system to data map a projection for the gaze "off screen" on to the plane of an I/O component 107 (e.g., such as a keyboard) or on to a non-display half 602 (e.g., base or keyboard half) of a notebook computer 600 that is positioned separate from and outside the display screen area of display 109 of the lid component 604 of the same notebook computer 600 as shown in FIG. 6, and thus tracking the gaze of user 250 "off screen". An example of such an "off screen" landmark that may be so designated as an predetermined activation area is shown in FIG. 6, in which an icon, logo or badge 610 of notebook computer 600 below the display area of display screen 109 is designated as an activation area "hotspot" for the gaze of user 250. In yet another embodiment, a user may be enabled to predefine and set their own custom location or landmark as an activation area for triggering the voice assistant companion (within the limits of the capability of the eye tracking system 140), e.g., by allowing user to input a custom activation area position (e.g., via I/O device/s 107) for storage in non-volatile memory and future retrieval and use by eye tracking service logic 189 for triggering display of UI 115 in a manner as described further herein.

Next, as shown in window 306 of the exemplary embodiment of FIG. 3, user 250 has centered their gaze 375 like a "spotlight" onto the position of UI 115, which is detected by eye tracking service 189 based on input data from eye tracking system 140 in a manner as previously described. This causes eye tracking service 189 to handoff or transfer control to UI overlay service 184 which fully activates (e.g., without requiring any spoken user activation command) and causes display of UI 115 in full opaque view on top of gaming scene 117 as shown in window 306 of FIG. 3. In one embodiment, UI overlay service 184 may optionally cause opaque display of UI 115 by revealing a larger radius or other shape of UI 115 than the minimum tracking size corresponding to gaze points provided by eye tracking system 140 and/or eye tracking service logic 189.

UI 115 may take a variety of different forms. For example, in one embodiment UI 115 may be a logo or other symbol that indicates listening state of a voice assistant of the UI overlay service 184, e.g., showing that a voice assistant of the UI overlay service 184 is activated and that speech recognition/understanding logic 186 is now listening for voice commands from user 250. In other alternative embodiments, the listening state of the voice assistant of the UI overlay service 184 may be conveyed to user 250 in other ways and/or using other hardware, such as audio cues (designated sounds such as a beep produced by speaker/audio out hardware 111), hardware lighting, or keyboard or touch pad haptic motion (such as vibration).

When UI overlay service 184 is so activated, methodology 200 of FIG. 2 proceeds to step 208 where game chat outgoing voice audio from system 110 is muted by overlay service logic 184 so that users of other systems $151_1$-$151_N$ cannot hear words spoken by user 250 into microphone and audio-in circuitry 105. Then in step 210, speech recognition/understanding logic 186 begins to listen for voice commands spoken by user 250 and received via microphone and audio-in circuitry 105, and if necessary continues to do so in step 211 for a maximum listening time threshold (e.g., 8 seconds or other predefined greater or lesser time) even if user 250 now directs their gaze away (or looks away) from the designated position of the activation area for UI 115. Examples of speech recognition algorithms that may be employed by speech recognition/understanding logic 186 to recognize user voice commands when spoken by user 250 include, but are not limited to, Hidden Markov models, Artificial Neural Networks, Deep/Machine Learning, or other suitable algorithms.

As soon as a user voice command is spoken in step 212 and detected by speech recognition/understanding logic 186 then methodology 200 proceeds to step 213 where speech recognition/understanding logic 186 determines whether a predefined voice command is recognized. Examples of predefined user voice commands that may be spoken by a user 250 and recognized by speech recognition/understanding logic 186 in step 212 are shown below in Table 1, together with corresponding predefined given actions to be taken by overlay service logic 184 and/or other components of system 110 when a user 250 speaks each voice command. Such a relationship of predefined user voice commands and corresponding response actions may be previously stored, for example, as a lookup table on non-volatile storage 108 of information handling system 110, on other non-volatile memory of information handling system 110 (e.g., such as Flash memory), on non-volatile server cloud storage that is accessible by information handling system 110 across network 190, etc.

It will be understood that the sample commands and actions of Table 1 are exemplary only, and that additional, fewer and/or other user voice commands and corresponding actions may be alternatively implemented in a similar manner. Further, in one embodiment, user 250 may be allowed to predefine and store their own commands and/or corresponding response actions. In one embodiment, identification data corresponding to pre-selected voice commands may be pre-stored on non-volatile storage of system 110, on other non-volatile memory (e.g., such as Flash memory) of information handling system 110, on non-volatile server cloud storage accessible by information handling system 110 across network 190, etc., and then retrieved and used by logic 186 during execution of application 182 to compare and recognize when one of these commands is spoken by user 250.

TABLE 1

Sample Voice Commands and Actions

| VOICE COMMAND | CORRESPONDING ACTION IN RESPONSE TO COMMAND |
|---|---|
| "Change my theme to XXXX" | Changes keyboard or display lighting to pre-determined lighting theme (colors, light pattern, etc.) identified by name "XXXX" |
| "Change my macros to YYYY" | Changes available keyboard macros to a set of pre-determined keyboard macro/s identified by name "YYYY" |
| "Record this" | Records current gaming session to storage for later replay |
| "Reply back with ZZZZ" | Replies back to in-game message. Dictates user's reply "ZZZZ" and sends it. |
| "Open Twitch" | Opens Twitch application |
| "Close game" | Closes current game |
| "Open Discord" | Opens Discord application (Discord is a Slack-like app for gamers) |
| "View messages" | Views available in-game messages |
| "Open Steam" | Opens Steam application |
| "Start stream" | Starts in-game twitch stream |
| "Disable chat" | Disables (mutes) voice chat during normal gaming operation |
| "Enable chat" | Enables (unmutes) voice chat during normal gaming operation |
| "Send <name> a direct message" | Sends text message to other player identified by name "<name>" |
| "Go to twitch.com" | Opens web page identified by "twitch.com" |
| "Post this on Facebook" | Posts current game video clip to Facebook |
| "Post this on Twitter" | Posts current game screen shot to Twitter |
| "Take a screenshot" | Takes a screenshot of current game play scene |
| "Upload video to YouTube" | Uploads video of the current game to YouTube.com |
| "Open settings" | Opens app settings for overlay/voice assistant |
| "Stop Listening" | Disables speech recognition/understanding feature |

When user 250 speaks a given command in step 212 that is recognized in step 213, then speech recognition/understanding logic 186 communicates data identifying the given command to overlay service logic 184, which dispatches the given command in step 214 by software execution of the overlay service logic 184 in any suitable manner depending on the nature of the feature (command and/or response action), such as by handoff to the application 182 via an API call, using code within the overlay service software logic 184, etc. After the command is so dispatched in step 214, the game chat outgoing voice audio from system 110 is unmuted in step 216 by overlay service logic 184 so that users of other systems $151_1$-$151_N$ can now again hear words spoken by user 250 into microphone and audio-in circuitry 105 across network 190. At this time UI overlay service 184 deactivates to no longer display UI 115 on video display 109, and methodology 200 returns to normal game operation of step 201 with UI overlay service 184 idle as shown by return arrow to window 302 in FIG. 3.

In the case that no user voice command is recognized by speech recognition/understanding logic 186 within the threshold maximum listening time of step 211, then methodology 200 proceeds to step 213 where it is determined that no voice command is recognized, the game chat outgoing voice audio from system 110 is unmuted in step 216 by overlay service logic 184 so that users of other systems $151_1$-$151_N$ can now again hear words spoken by user 250 into microphone and audio-in circuitry 105 across network 190. At this time UI overlay service 184 deactivates to no longer display UI 115 on video display 109, and methodology 200 returns to normal game operation of step 201 with UI overlay service 184 idle as shown by return arrow to window 302 in FIG. 3. In this case, step 214 is skipped and no command is dispatched.

In other optional embodiments, overlay service logic 184 may determine at what time to deactivate UI overlay service 184 based on alternative and/or additional criteria, such as when the "spotlight" of the user's gaze 375 is no longer fully directed onto the "landmark" fixed position of UI 115, and/or when other action occurs such as after the speech recognition/understanding logic 186 has heard and recognized a full user voice command (e.g., predefined voice command of Table 1), or when maximum listening time threshold (e.g., 8 seconds or other predefined greater or lesser time) of step 211 has expired without receiving a recognized voice command.

Figure 4:
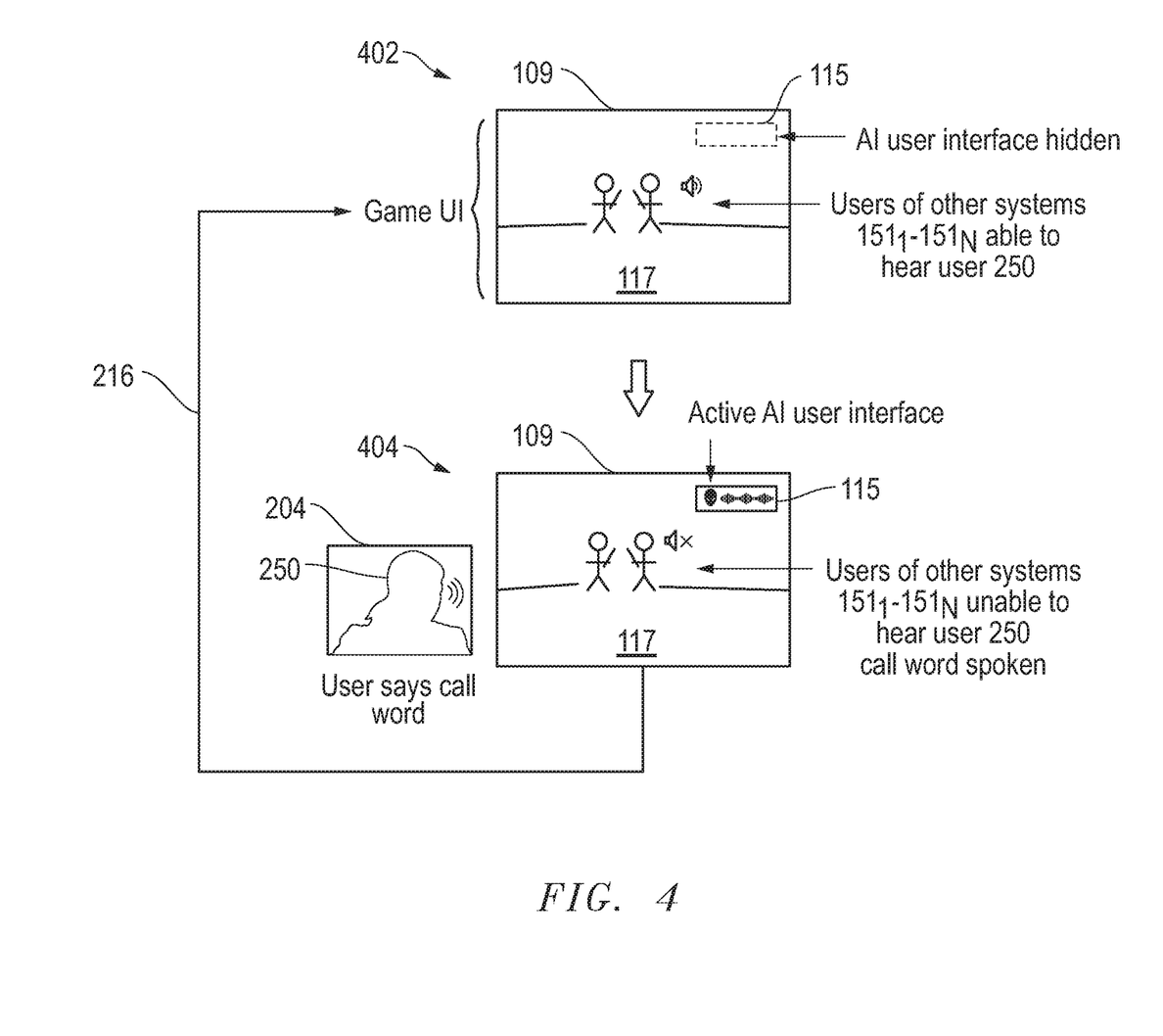
FIG. 4 illustrates methodology according to one exemplary embodiment of the disclosed systems and methods.

Referring now to the embodiment of FIG. 4, window 402 illustrates normal game play condition with UI overlay service 184 idle (corresponding to step 201 of FIG. 2) that continues until user voice activation action 204 occurs. Until user voice activation action 204 occurs, voice chat operation on system 110 remains active and unmuted, so that users of other systems $151_1$-$151_N$ continue to hear words spoken by user 250 into microphone and audio-in circuitry 105. As shown in window 404 of FIG. 4, a user voice activation action 204 may be implemented by speech recognition/understanding logic 186 when it detects that user 250 has spoken a particular activation call word or activation phrase, e.g., that may be previously stored in memory 104 and/or nonvolatile storage 108 for retrieval and comparison to the current spoken word or phrase by speech recognition/understanding logic 186. An activation call word or activation phrase may in one embodiment be pre-selected by user 250, although it may also be pre-designated by a software publisher of the speech recognition/understanding logic 186. Examples of a spoken activation call word would be the word "options" or the word "visualize", and examples of a spoken activation phrase would be the phrase "show me options" or "display options". Until the voice chat operation is muted, other players may be able to hear the spoken activation call word or activation phrase, such that the embodiment of FIG. 4 may be particular desirable for use with a single player game that does not have other user players.

In one embodiment speech recognition/understanding logic 186 may be implemented to include a low power hardware accelerated keyword spotter solution that continuously listens for invocation of an activation word/phrase or call word (e.g., in manner similar to Microsoft Cortana), and then processes the audio of a user command further with software logic once the activation phrase is spoken. In this regard, an activation phrase may be predefined by the user 250, or may alternately be predefined as a standard activation phrase that is preset by the game or application publisher (e.g., such as "Hey Alienware").

Upon detection of the user 250 speaking a particular designated activation phrase (activation call word) by speech recognition/understanding logic 186, user voice activation action 204 occurs (corresponding to step 202 of FIG. 2) to transfer or hand off control to UI overlay service 184 executing on host processing device 102, which activates to display UI 115 on video display 117. At this time, methodology 200 of FIG. 2 proceeds to step 208 where game chat outgoing voice audio from system 110 is muted by overlay service logic 184 so that users of other systems $151_1$-$151_N$ cannot hear words spoken by user 250 into microphone and audio-in circuitry 105. Steps 208-216 of methodology 200 may then be performed in similar manner as previously described in relation to the embodiment of FIG. 3. As before, methodology 200 returns to normal game operation of step 201 with UI overlay service 184 idle when overlay service 184 is deactivated to no longer display UI 115 as shown by return arrow to window 502 in FIG. 4.

Figure 5:
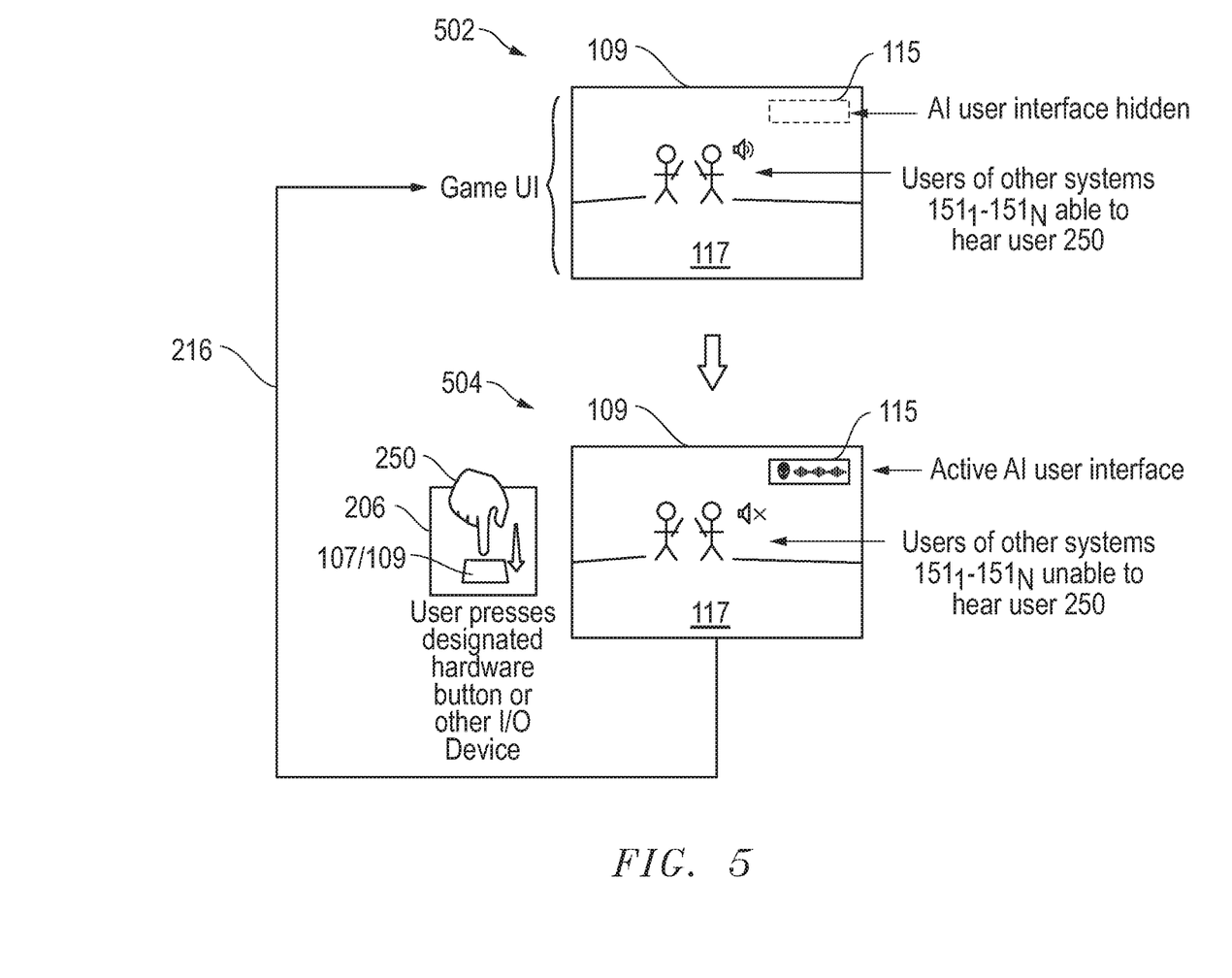
FIG. 5 illustrates methodology according to one exemplary embodiment of the disclosed systems and methods.

Referring now to the embodiment of FIG. 5, window 502 illustrates normal game play condition with UI overlay service 184 idle (corresponding to step 201 of FIG. 2) that continues until hardware I/O activation action 206 occurs. Until hardware I/O activation action 206 occurs, voice chat operation on system 110 remains active and unmuted, so that users of other systems $151_1$-$151_N$ continue to hear words spoken by user 250 into microphone and audio-in circuitry 105. As shown in window 504 of FIG. 4, a hardware I/O activation action 206 may be detected by hardware I/O service logic 187 when it detects that user 250 has actuated designated hardware of I/O 107, e.g., such as by depressing a particular designated keyboard hotkey (or designated combination of keyboard hotkeys) or by pressing or physically touching other hardware switch or sensor of I/O 107, such as a designated hardware toggle switch, button, touch pad or other type of sensor pad. In one embodiment, actuation of designated hardware of I/O 107 may be detected by virtue of an I/O input signal/s received by OS 180 executing on host processor 102, either directly from the I/O hardware 107 or from another intervening processing device such as a keyboard controller 121 and/or embedded controller 101, e.g., and read in conjunction with system basic input/output system "BIOS" executing on host 102 and/or EC 101. Examples of such input I/O signals and suitable techniques for processing the same may be found described in U.S. Pat. Nos. 8,700,829, 9,696,793, and 9,468,853, each of which is incorporated herein by reference in its entirety for all purposes.

Upon detection of a hardware I/O actuation by hardware I/O service logic 187, hardware I/O activation action 206 occurs (corresponding to step 202 of FIG. 2) to transfer or hand off control to UI overlay service 184 executing on host processing device 102, which activates to display UI 115 on video display 117. At this time, methodology 200 of FIG. 2 proceeds to step 208 where game chat outgoing voice audio from system 110 is muted by UI overlay service logic 184 so that users of other systems $151_1$-$151_N$ cannot hear words spoken by user 250 into microphone and audio-in circuitry 105. Steps 208-216 of Methodology 200 may then be performed in similar manner as previously described in relation to the embodiment of FIG. 3. As before, methodology 200 returns to normal game operation of step 201 with UI overlay service 184 idle when overlay service 184 is deactivated to no longer display UI 115 as shown by return arrow to window 502 in FIG. 5.

Following is just one example of how the methodology of the embodiments of FIGS. 2, 3, 4, and/or 5 may be implemented by a user 250 that is currently playing a common team-based online game application 182 on system 110 in a current gaming session with other players who are playing the same game application on their respective systems $151_1$-$151_N$ of FIG. 1. In this example, the user 250 suddenly desires to make a last minute character change during the current gaming session, after having made an initial selection of character "X" (e.g., a particular game character having a first set of abilities). User 250 may desire such a change, for example, after noticing that another player on his team has also selected the same character "X", which is less than optimal since the user 250's team will be imbalanced in abilities if two of the team players both use character "X". The user therefore wants to change their character before the match begins to new character "Y" that has a second and different set of abilities that are synergistic with the first set of abilities of the other player's character "X". However, user 250's keyboard macros (e.g., pre-assigned combinations or sequences of actions that may include keystrokes, mouse clicks, delays, etc.) and lighting on their computer system 110 are both already optimized for controlling actions of character "X" and are not optimized for character "Y".

In this example, instead of interrupting the game application 182 in the conventional manner to leave the current gaming session and enter changes to these keyboard macros and lighting settings for the new character "Y", the user 250 may employ the disclosed methodology 200 of FIG. 2 without interrupting the game application 182 to both change to character "Y" and to make the changes to their keyboard macros and lighting settings on their computer system 110 that are optimized for character "Y" in a relatively short amount of time (e.g., in 10 seconds to 30 seconds or other greater or lesser time period) without interrupting or leaving the current gaming session of the game application 182 or delaying the start of the match with the other players.

In this example, methodology 200 starts in step 201 of FIG. 2 with character "X" and its corresponding keyboard macros and lighting still selected. The user 250 then activates the UI overlay service 184 in user activation step 202, e.g., by performing one of user activation actions 203, 204 or 206 without leaving or interrupting the current gaming session. Upon performance of one of these user activation actions, the user's in-game microphone and audio input circuitry 105 is muted in step 208 and the speech recognition/understanding logic 186 begins listening for voice commands spoken by user 250 in step 210. At this time the user 250 speaks a command/s in step 212 to quickly change the keyboard macros and lighting settings on computer system 110 from a first set of keyboard macros and lighting settings optimized for the character "X" to a second predefined set of different keyboard macros and lighting settings stored on storage 108 that are optimized for the new character "Y" the command is recognized in step 213, and UI overlay service logic 164 dispatches and completes this command in step 214. The user 250 may also make the change from character "X" to character "Y" in a similar manner using voice commands, or may make the change using the normal character selection interface of the game application 182. At this time, UI overlay service logic 184 may optionally provide an audible confirmation (e.g., verbal or beep sound) of the completion of this change to user 250 via audio output circuitry and speaker 111. After these changes are completed, methodology 200 proceeds to step 216 where the user 250's in-game microphone and audio input circuitry 105 is unmuted and normal game operation is resumed with UI overlay service 184 idle in step 201 for the current gaming session. In this example, the match of the current gaming session now begins.

It will be understood that methodologies of FIGS. 2, 3, 4 and 5 are exemplary only, and that any combination of fewer, additional and/or alternative steps may be employed that are suitable for activating a user interface for temporarily receiving user voice commands with online voice chat capability temporarily disabled, and then implementing one or more actions based on these received user voice commands.

It will be understood that one or more of the tasks, functions, or methodologies described herein (e.g., including those described herein for components 102, 104, 108, 180, 182, 184, 186, 187, 189, 140, 109, 105, 106, 107, 111 etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:
1. A method, comprising:
executing an application on a first information handling system to display a graphics scene to a human user of the first information handling system on a display device;
receiving analog audio sounds from the human user of the first information handling system that is viewing the displayed graphics scene, and transferring the received audio sounds from the first information handling system as outgoing voice chat to one or more other information handling systems communicatively coupled by a network to the first information handling system;
detecting an activation action from the human user of the first information handling system while the voice chat is unmuted and while the graphics scene is displayed on the display device; and
selectively activating at least one deactivated separate service on the first information handling system that is different from the executing application to respond to the detected activation action without interrupting the executing application, the response by the separate service to the detected activation action comprising:
temporarily muting the outgoing voice chat and using speech recognition while the outgoing voice chat is muted to receive and analyze any analog audio signals received from the human user of the first information handling system while the outgoing voice chat is muted to recognize a predefined voice command spoken by the human user of the first information handling system while the outgoing voice chat is muted, then, while the outgoing voice chat remains muted, executing a command corresponding to the predefined voice command to take at least one predefined response action while the outgoing voice chat remains muted to modify one or more operating characteristics of the executing application and/or other components of the information handling system, and then unmuting the outgoing voice chat and deactivating the separate service after and in response to executing the command.

2. The method of claim 1, where the response by the separate service to the detected activation action further comprises temporarily muting the outgoing voice chat while using speech recognition while the outgoing voice chat is muted to receive and analyze any analog audio signals received from the human user of the first information handling system while the outgoing voice chat is muted to recognize a predefined voice command spoken by the human user of the first information handling system for a predetermined maximum threshold value of elapsed listening time that begins when the activation action is first detected; and then unmuting the outgoing voice chat and deactivating the separate service after expiration of the predetermined maximum threshold value of elapsed listening time if no analog audio signals are received before the expiration of the predetermined maximum threshold value of elapsed listening time that are recognized as a predefined voice command spoken by the human user of the first information handling system.

3. The method of claim 2, further comprising only using the speech recognition while the outgoing voice chat is muted during the predetermined maximum threshold value of elapsed listening time to receive and analyze any analog audio signals received from the human user of the first information handling system while the outgoing voice chat is muted to recognize a predefined voice command spoken by the human user of the first information handling system.

4. The method of claim 1, where the detected activation action from the human user of the first information handling system comprises detection of a tracked gaze of the human user of the first information handling system upon a predetermined activation area.

5. The method of claim 1, where the detected activation action from the human user of the first information handling system comprises detection of a predetermined call word or activation phrase spoken by the human user of the first information handling system.

6. The method of claim 1, where the detected activation action from the human user of the first information handling system comprises detection of the actuation of a predetermined hardware (input/output) I/O of the first information handling system by the human user of the first information handling system.

7. The method of claim 1, further comprising responding to the detected activation action by temporarily displaying a user interface (UI) over at least a portion of the graphics scene on the display device while muting the outgoing voice chat and using speech recognition to receive and analyze any analog audio signals received from the human user of the first information handling system while the outgoing voice chat is muted to recognize a predefined voice command spoken by the human user of the first information handling system; and then ceasing display of the UI over the at least a portion of the graphics scene on the display device when unmuting the outgoing voice chat.

8. The method of claim 1, further comprising responding to the detected activation action by:

temporarily muting the outgoing voice chat and using speech recognition while the outgoing voice chat is muted for a predetermined maximum threshold value of elapsed listening time to listen for and analyze any analog audio signals received from the human user of the first information handling system while the outgoing voice chat is muted to recognize a predefined voice command spoken by the human user of the first information handling system while the outgoing voice chat is muted, then executing a command corresponding to any predefined voice command received before expiration of the predetermined maximum threshold value of elapsed listening time to take the at least one predefined response action while the outgoing voice chat remains muted to modify the one or more operating characteristics of the executing application and/or other components of the information handling system, and then unmuting the outgoing voice chat upon occurrence of either the expiration of the predetermined maximum value of elapsed listening time threshold or after and in response to the execution of the command corresponding to a predefined voice command to take the at least one predefined response action to modify the one or more operating characteristics of the executing application and/or other components of the information handling system.

9. The method of claim 1, where the at least one response action comprises at least one of opening a new application on the first information handling system, closing an existing application on the first information handling system, sending a text message or in-application message from the first information handling system to a user of another information handling system, recording a video on the first information handling system or taking a screenshot of the displayed graphics scene on the first information handling system, uploading or posting a video or screenshot of the displayed graphics scene across the network from the first information handling system to a server, changing a selected keyboard lighting theme on the first information handling system, changing keyboard haptics settings on the first information handling system, or changing a selected keyboard macro on the first information handling system.

10. A method, comprising:

executing an application on a first information handling system to display a graphics scene to a human user of the first information handling system on a display device;

tracking a gaze of the human user of the first information handling system that is viewing the displayed graphics scene;

detecting a location of the tracked gaze of the human user of the first information handling system relative to a location of a predetermined activation area while the graphics scene is displayed on the display device;

receiving analog audio sounds from the human user of the first information handling system that is viewing the displayed graphics scene, and transferring the received audio sounds from the first information handling system as outgoing voice chat to one or more other information handling systems communicatively coupled by a network to the first information handling system as long as the detected location of the tracked gaze of the human user of the first information handling system does not coincide with the location of the predetermined activation area; and then without interrupting the executing application, selectively activating at least one deactivated separate service on the first information handling system that is different from the executing application to respond to detecting that the location of the tracked gaze of the human user of the first information handling system while the voice chat is unmuted coincides with at least a portion of the location of the predetermined activation area, the response by the separate service to the detected activation action comprising:

temporarily muting the outgoing voice chat and using speech recognition while the outgoing voice chat is muted to receive and analyze any analog audio signals received from the human user of the first information handling system while the outgoing voice chat is muted to recognize a predefined voice command spoken by the human user of the first information handling system while the outgoing voice chat is muted,     then, while the outgoing voice chat remains muted, executing a command corresponding to the predefined voice command to take at least one predefined response action while the outgoing voice chat remains muted to modify one or more operating characteristics of the executing application and/or other components of the information handling system, and     then unmuting the outgoing voice chat and deactivating the separate service after and in response to executing the command.

11. The method of claim 10, where the predetermined activation area is located within the graphics scene displayed to the human user of the first information handling system within the display area of the display device.

12. The method of claim 10, where the predetermined activation area is located separate from and outside the display screen area of the display device.

13. The method of claim 10, further comprising responding to detecting that the location of the tracked gaze of the human user of the first information handling system coincides with at least a portion of the location of the predetermined activation area by temporarily displaying a user interface (UI) over at least a portion of the graphics scene on the display device while muting the outgoing voice chat and using speech recognition to analyze any analog audio signals received from the human user of the first information handling system while the outgoing voice chat is muted to recognize a predefined voice command spoken by the human user of the first information handling system; and then ceasing display of the UI over the at least a portion of the graphics scene on the display device when unmuting the outgoing voice chat.

14. A system, comprising a first information handling system comprising at least one programmable integrated circuit executing an application to display a graphics scene to a human user of the first information handling system on a display device that is coupled to the programmable integrated circuit, the at least one programmable integrated circuit further executing to:

receive analog audio sounds from the human user of the first information handling system that is viewing the displayed graphics scene, and transfer the received audio sounds from the first information handling system as outgoing voice chat to one or more other information handling systems communicatively coupled by a network to the first information handling system;

detect an activation action from the human user of the first information handling system while the voice chat is unmuted and while the graphics scene is displayed on the display device; and     selectively activate at least one deactivated separate service on the first information handling system that is different from the executing application to respond to the detected activation action without interrupting the executing application, the response by the separate service to the detected activation action comprising:

temporarily muting the outgoing voice chat and using speech recognition while the outgoing voice chat is muted to receive and analyze any analog audio signals received from the human user of the first information handling system while the outgoing voice chat is muted to recognize a predefined voice command spoken by the human user of the first information handling system,         then, while the outgoing voice chat remains muted, executing a command corresponding to the predefined voice command to take at least one predefined response action while the outgoing voice chat remains muted to modify one or more operating characteristics of the executing application and/or other components of the information handling system, and         then unmuting the outgoing voice chat and deactivating the separate service in response to executing the command.

15. The system of claim 14, the at least one programmable integrated circuit of the first information handling system executing to temporarily mute the outgoing voice chat while using speech recognition while the outgoing voice chat is muted to receive and analyze any analog audio signals received from the human user of the first information handling system while the outgoing voice chat is muted to recognize a predefined voice command spoken by the human user of the first information handling system for a predetermined maximum threshold value of elapsed listening time that begins when the activation action is first detected; and then unmute the outgoing voice chat and deactivate the separate service after expiration of the predetermined maximum threshold value of elapsed listening time if no analog audio signals are received before the expiration of the predetermined maximum threshold value of elapsed listening time that are recognized as a predefined voice command spoken by the human user of the first information handling system.

16. The system of claim 15, the at least one programmable integrated circuit of the first information handling system executing to use the speech recognition while the outgoing voice chat is muted during the predetermined maximum threshold listening time to receive and analyze any analog audio signals received from the human user of the first information handling system while the outgoing voice chat is muted to recognize a predefined voice command spoken by the human user of the first information handling system.

17. The system of claim 14, where the detected activation action from the human user of the first information handling system comprises at least one of detection of a tracked gaze of the human user of the first information handling system upon a predetermined activation area, detection of a predetermined call word or activation phrase spoken by the human user of the first information handling system, or detection of actuation of a predetermined hardware (input/output) I/O of the first information handling system by the human user of the first information handling system.

18. The system of claim 14, the at least one programmable integrated circuit of the first information handling system executing to respond to the detected activation action by temporarily displaying a user interface (UI) over at least a portion of the graphics scene on the display device while muting the outgoing voice chat and using speech recognition to receive and analyze any analog audio signals received from the human user of the first information handling system while the outgoing voice chat is muted to recognize a predefined voice command spoken by the human user; and then ceasing display of the UI over the at least a portion of the graphics scene on the display device when unmuting the outgoing voice chat.

19. The system of claim 14, the at least one programmable integrated circuit of the first information handling system executing to respond to the detected activation action by:
  temporarily muting the outgoing voice chat and using speech recognition while the outgoing voice chat is muted for a predetermined maximum threshold listening time to listen for and analyze any analog audio signals received from the human user of the first information handling system while the outgoing voice chat is muted to recognize a predefined voice command spoken by the human user of the first information handling system,
  then executing a command corresponding to any predefined voice command received before expiration of the predetermined maximum threshold listening time to take the at least one predefined response action to modify the one or more operating characteristics of the executing application and/or other components of the information handling system, and
  then unmuting the outgoing voice chat upon occurrence of either the expiration of the predetermined maximum listening time threshold or upon the execution of the command corresponding to a predefined voice command to take the at least one predefined response action to modify the one or more operating characteristics of the executing application and/or other components of the first information handling system.

20. The method of claim 1, where the at least one response action comprises at least one of opening a new application on the first information handling system, closing an existing application on the first information handling system, sending a text message or in-application message from the first information handling system to a user of another information handling system, recording a video on the first information handling system or taking a screenshot of the displayed graphics scene on the first information handling system, uploading or posting a video or screenshot of the displayed graphics scene across the network from the first information handling system to a server, changing a selected keyboard lighting theme on the first information handling system, changing keyboard haptics settings on the first information handling system, or changing a selected keyboard macro on the first information handling system.

21. The method of claim 1, further comprising:
  continuously tracking a gaze of the human user of the first information handling system relative to a predetermined fixed landmark position of a user interface (UI), where the activation action from the human user of the first information handling system is detected only when the tracked gaze of the user of the first information handling system is directed onto the entirety of the landmark position of UI;
  automatically hiding the UI so that it is not visible on the display device at any time the tracked gaze of the user of the first information handling system is not directed onto any portion of the landmark position of the hidden UI, while at the same time automatically keeping the outgoing voice chat unmuted at any time the UI is hidden and not visible on the display device;
  then automatically displaying only a first portion of the UI on the display device over at least a portion of the graphics scene and hiding a second portion of the UI on the display device in response to detecting that the tracked gaze of the user of the first information handling system being directed only onto the first portion of the landmark position of the hidden UI and not onto the second portion of the landmark position of UI on the display device, while at the same time automatically keeping the outgoing voice chat unmuted at any time any portion of the UI remains hidden and not visible on the display device; and
  then detecting the activation action and displaying the entirety of the UI on the display device over the graphics scene in response to detecting that the tracked gaze of the user of the first information handling system is directed onto the entirety of the landmark position of UI, while at the same time automatically muting the outgoing voice chat and automatically activating the separate service at any time the entirety of the UI is displayed and visible over the graphics scene on the display device;
  then, while the outgoing voice chat remains muted, automatically executing the command corresponding to the predefined voice command to take at least one predefined response action while the outgoing voice chat remains automatically muted to modify one or more operating characteristics of the executing application and/or other components of the information handling system; and
  then automatically unmuting the outgoing voice chat, automatically deactivating the separate service and automatically hiding the UI so that it is not visible on the display device after and in response to executing the command.

22. The method of claim 2, where the predetermined maximum threshold value of elapsed listening time is a predefined maximum time period that is predefined as a maximum number of seconds of elapsed listening time.

23. The system of claim 14, where the at least one programmable integrated circuit is further executing to:
  continuously track a gaze of the human user of the first information handling system relative to a predetermined fixed landmark position of a user interface (UI), where the activation action from the human user of the first information handling system is detected only when the tracked gaze of the user of the first information handling system is directed onto the entirety of the landmark position of UI;
  automatically hide the UI so that it is not visible on the display device at any time the tracked gaze of the user of the first information handling system is not directed onto any portion of the landmark position of the hidden UI, while at the same time automatically keeping the outgoing voice chat unmuted at any time the UI is hidden and not visible on the display device;

then automatically display only a first portion of the UI on the display device over at least a portion of the graphics scene and hiding a second portion of the UI on the display device in response to detecting that the tracked gaze of the user of the first information handling system being directed only onto the first portion of the landmark position of the hidden UI and not onto the second portion of the landmark position of UI on the display device, while at the same time automatically keeping the outgoing voice chat unmuted at any time any portion of the UI remains hidden and not visible on the display device; and then detect the activation action and displaying the entirety of the UI on the display device over the graphics scene in response to detecting that the tracked gaze of the user of the first information handling system is directed onto the entirety of the landmark position of UI, while at the same time automatically muting the outgoing voice chat and automatically activating the separate service at any time the entirety of the UI is displayed and visible over the graphics scene on the display device;

then, while the outgoing voice chat remains muted, automatically execute the command corresponding to the predefined voice command to take at least one predefined response action while the outgoing voice chat remains automatically muted to modify one or more operating characteristics of the executing application and/or other components of the information handling system; and then automatically unmute the outgoing voice chat, automatically deactivate the separate service and automatically hide the UI so that it is not visible on the display device after and in response to executing the command.

24. The system of claim 15, where the predetermined maximum threshold value of elapsed listening time is a predefined maximum time period that is predefined as a maximum number of seconds of elapsed listening time.

\* \* \* \* \*